Patented June 17, 1952

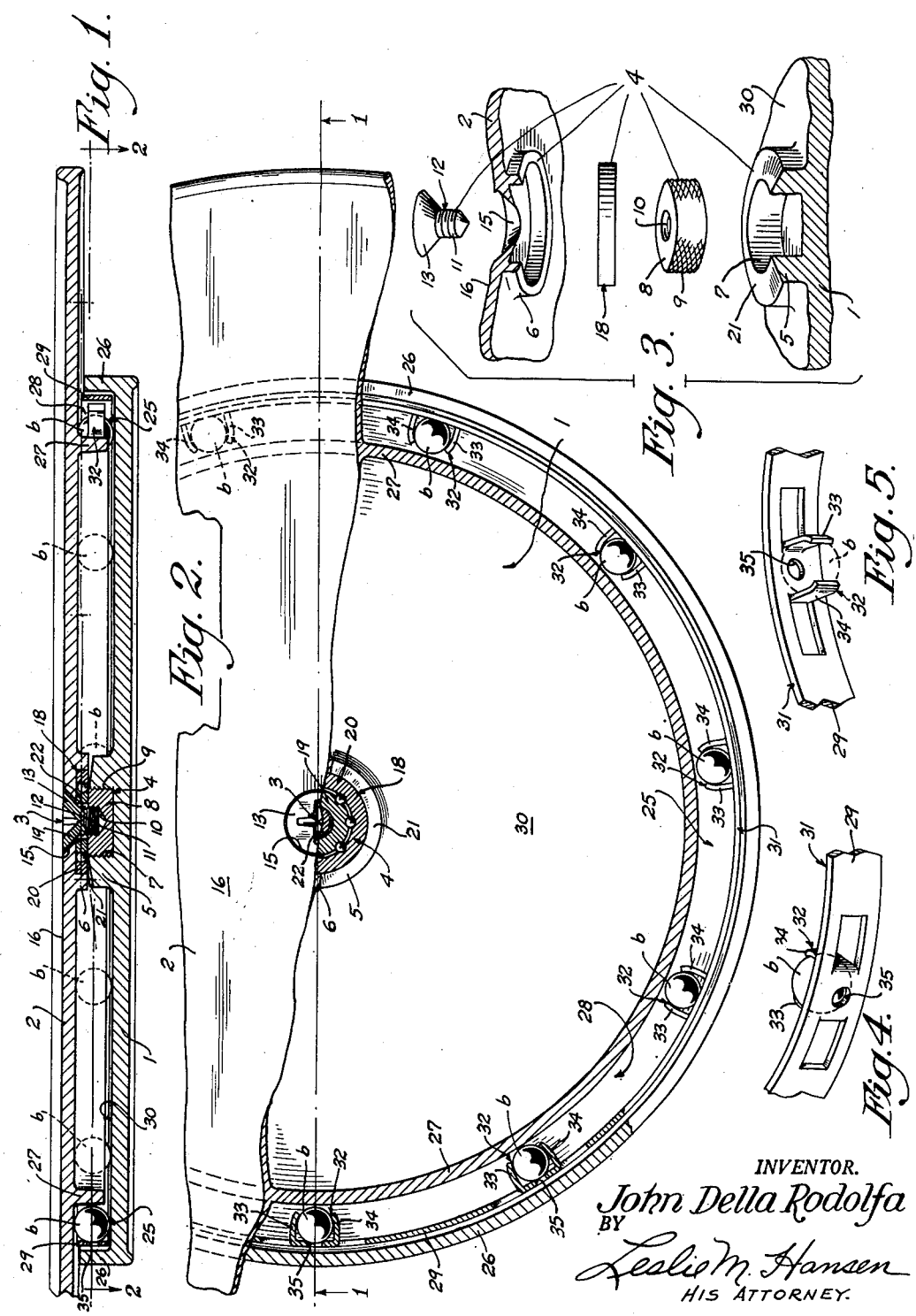

2,600,922

UNITED STATES PATENT OFFICE 2,600,922

OUTER BEARING FOR ROTATABLE SERVERS

John Della Rodolfa, San Jose, Calif.

Application May 20, 1949, Serial No. 94,328

2 Claims. (Cl. 308—227)

This invention relates to rotatable servers of the type disclosed in my United States Patent No. 2,198,091, issued April 23, 1940, and more particularly to improvements in construction of such types of rotating apparatus.

It is one object of this invention to provide a pair of trays connected by a hub, with an outer bearing structure for effecting free floating rotation thereof relative to each other.

Another object is to provide the trays with cooperating raceways within which to confine load supporting balls for facilitating ease of movement of the trays relative to each other.

It is another object to provide an annular ball retaining strap for maintaining the balls in spaced relation and for facilitating speedy assembly of the rotating trays with each other.

Still another object is to provide in rotatable servers an improved outer bearing structure which is simple in construction, economical to manufacture and highly efficient in use.

These and other objects and advantages will become apparent in the following description when read in the light of the drawings in which:

Fig. 1 is a diametrical section through a server embodying my new construction and as seen substantially from line 1—1 in Fig. 2.

Fig. 2 is a fragmentary plan of the device shown in Fig. 1 with parts broken away for purposes of illustration, the view being taken substantially along line 2—2 of Fig. 1.

Fig. 3 is an exploded illustration of the hub structure shown in Figs. 1 and 2.

Fig. 4 is a fragmentary perspective view of a portion of the ball retaining ring forming a part of my invention and as viewed from without the annulus formed by such portion of the ring.

Fig. 5 is a perspective similar to that of Fig. 4, with the ball removed and as seen from within the annulus of the ring depicted.

Referring now to Figs. 1 and 2, a base is indicated by reference numeral 1 with a tray or plate labeled 2 above it and pivotally secured as at 3 thereto by an axial hub 4 to provide a structure commonly known as a "Lazy-Susan."

The invention herein relates to an improved construction in which the base and tray may be constructed from plastic material such as pressed-wood although cast metal may equally serve if desired.

The hub structure 4 of the present invention comprises an upstanding boss 5 formed concentrically of the base 1 and a similarly disposed depending flange 6 formed on the underside of the tray 2, see Fig. 3.

This boss 5 is provided with a recess 7 into which is press-fit a metal block 8, the outer walls 9 of which are knurled so as to securely grab into the relatively pliable walls of the plastic boss 5 when the block is suddenly forced into the recess 7.

The block 8 has a tapped central bore 10 adapted to receive the shank 11 of a screw 12 having an enlarged counter sunk head 13. The shank of the screw 12 is inserted through a frusto conical bore 15 in the upper surface 16 of the tray 2 which bore 15 is substantially larger in size than the outer limits of the head 13 of the screw so as to leave a clearance space around the head 13.

A ball bearing unit 18 is disposed within the depending flange 6, the inner race 19 of the unit 18 resting on the top of the block 8 and the outer race 20 being press-fit into the annular recess provided by flange 6. It will be noted here that the upper surface 21 of the boss 5 tapers away from the block 8 to prevent frictional contact between the surface 21 and the bottom of the annular flange 6 as well as the outer race 20 of the ball bearing unit.

The opening 22 provided by the inner race 19 of the unit 18 is of lesser diameter than the open bottom of the frusto-conical bore 15 so that the head 13 of the screw bears tightly down upon the inner race for holding the same securely against the top of the block 8. The aforementioned clearance space between the head 13 of the screw and the bore 15 allows for free rotative movement of the tray 2 without disturbing or effecting the tightness of the screw relative to the ball bearing unit 19 or the block 8.

The tray 2 may be of any diameter desired with assurance of free rotation thereof relative to the base 1 provided an outer bearing structure 25, now to be described, is suitably disposed with respect to the periphery of the tray 2.

The outer bearing structure 25 comprises an external flange 26, an internal flange 27 on the tray and cooperating with each other to provide a raceway 28 for a ball retaining ring 29 disposed therein.

The external flange 26 is preferably formed as an interal part of the base 1 at the perimeter thereof and extending upwardly from the floor 30 thereof, slightly less than the diameter of the ball b to be used in the raceway 28. The internal flange 27 is preferably formed integral with the tray 2 so as to be suspended therefrom a distance slightly less than the diameter of the balls b. The flanges 26 and 27 are so formed on their respective base and tray portions as to be spaced from each other sufficiently to receive the ball retaining ring 29 and balls b between them and to prevent access to the raceway 28 other than by removal of the tray and base from each other.

The ring 29 comprises a strap 31 of suitable material such as metal which can be stamped out upon a punch press or in a like manner. The strap is provided with a plurality of ball holders 32 equally spaced from each other lengthwise of the strap and each consisting of clamping arms 33 and 34 adapted to embrace one of the balls b.

These arms 33 and 34 are stamped out of the strap in pairs so as to extend therefrom substantially parallel to each other. During stamping of the arms 33 and 34 an aperture 35 is also stamped out of the strap between the arms and substantially midway the edges of the strap.

The strap 31 is then cut into desired lengths to comply with the circumference of the raceway 28 and the ends of the strap joined as by welding or the like. However, if desired, sufficient additional length may be had on the ends of the strap to facilitate an interlocking joint therebetween in any well known manner.

The strap thus formed provides the ring 29 and it is preferred, although not necessary, that the arms 33 and 34 of each ball holder extend inwardly of the annulus formed by the ring 29. In this manner the arms 33 and 34 will be radially disposed within the ring 29.

The balls b are inserted between respective pairs of arms 33 and 34 and as illustrated by the cross-hatched portion of the strap in Fig. 2, each ball extends slightly into the confines of the aperture 35 associated therewith. Each ball is embraced by the inturned ends of the arms 33 and 34 to maintain the ball in engagement with the aperture 35 to thereby prevent the balls from slipping out of the grasp of the clamping arms.

The entire ring 29 with balls assembled therein can now be moved around as a unit for assembly into the confines of the upstanding flange 26 on the base 1. The upper or tray member 2 is then disposed over the base 1 and the screw 12 secured in place, as hereinbefore explained, to thereby complete the rotatable server.

One of the principal advantages of the ball holding feature just described is found in the freedom of movement of the balls with regard to their respective clamping arms. In this connection it should be noted that the entire load at the perimeter zone of the tray is borne by the balls. Consequently the turning tray rolls upon the balls which in turn roll upon the floor of the base 1 with the least possible frictional resistance between the moving parts.

Since the tray part 2 freely rides upon the annularly arranged balls and the tray is spaced from the head 13 of the screw 12 it will be noted that the tray in effect floats above the base although it is adequately secured thereto.

It should also be noted that accurate spacing of the balls is always maintained so as to prevent bunching of the balls within the raceway 28 and consequent binding of the tray relative to the base. The number of balls may be increased to suit the circumference of the raceway 28 and the distribution of the load within safe limits among the several balls to assure perfect performance at all times.

While I have described my improved construction for rotatable servers in detail herein, it will be apparent that the same is susceptible to variations, modifications and alterations without departing from the spirit of my invention. I therefore desire to avail myself of all variations, modifications and alterations as fairly come within the scope of the appended claims.

What I claim as new and desire to protect by Letters Patent is:

1. An outer bearing structure for a rotatable server having a tray rotatably mounted on a base comprising an upstanding peripheral wall on said base, a depending flange on said tray and spaced inwardly of said upstanding wall to provide a raceway, a ball retaining ring disposed in said raceway, said ring comprising an endless strap having a plurality of pairs of arms punched therefrom at equal intervals so as to extend substantially radially of said ring, said strap having an aperture formed midway its upper and lower edges between each pair of said arms, and a ball of a diameter slightly greater than the depth of said flange and wall and embraced by each pair of said arms, said arms causing each ball to seat in the aperture between said arms for securing said balls to said ring for free rotation relative thereto.

2. A ball retaining ring comprising a strap of metal having a plurality of pairs of arms punched therefrom at equally spaced intervals along its length and an aperture formed in said strap between each pair of arms, said strap being bent into a ring and having its ends secured to each other whereby said pairs of arms extend inwardly therefrom substantially radially with respect to the annulus formed by said strap, and a ball embraced by each pair of arms and held thereby in engagement with the aperture therebetween for retaining said balls within said ring.

JOHN DELLA RODOLFA.

REFERENCES CITED

The following references are of record in the file of this patent:

UNITED STATES PATENTS

| Number | Name | Date |
|---|---|---|
| 434,474 | Simonds | Aug. 19, 1890 |
| 944,931 | Williams | Dec. 28, 1909 |
| 1,199,063 | Fleich | Sept. 26, 1916 |
| 1,226,134 | Srader | May 15, 1917 |
| 1,400,599 | Gabriel et al. | Dec. 20, 1921 |
| 1,534,848 | Glogoczi | Apr. 21, 1925 |
| 1,628,013 | Twedt | May 10, 1927 |
| 1,638,271 | Nordstrum | Aug. 9, 1927 |
| 1,941,906 | Markinsky | Jan. 2, 1934 |
| 2,072,515 | Delaval-Crow | Mar. 2, 1937 |
| 2,198,091 | Rodolfa | Apr. 23, 1940 |

FOREIGN PATENTS

| Number | Country | Date |
|---|---|---|
| 891,371 | France | Mar. 6, 1944 |